United States Patent [19]

Numata et al.

[11] 4,232,955
[45] Nov. 11, 1980

[54] MEMORY LOCKING MEANS OF AN EXPOSURE CONTROL CIRCUIT FOR A CAMERA

[75] Inventors: Saburo Numata; Shinichiro Fujino, both of Urawa, Japan

[73] Assignee: Fuji Photo Optical Co., Ltd., Omiya, Japan

[21] Appl. No.: 71,257

[22] Filed: Aug. 30, 1979

Related U.S. Application Data

[63] Continuation of Ser. No. 882,757, Mar. 2, 1978, abandoned, which is a continuation of Ser. No. 703,607, Jul. 8, 1976, abandoned.

[30] Foreign Application Priority Data

Jul. 8, 1975 [JP] Japan .................................. 50-83864

[51] Int. Cl.³ ............................................. G03B 7/089
[52] U.S. Cl. .................................................... 354/51
[58] Field of Search ...................................... 354/50, 51

[56] References Cited

U.S. PATENT DOCUMENTS

| | | |
|---|---|---|
| 3,324,779 | 6/1967 | Noleusawa et al. .................. 354/51 |
| 3,657,979 | 4/1972 | Noleusawa ........................ 354/51 X |
| 3,914,776 | 10/1975 | Tsujimoto et al. .................. 354/51 |
| 3,969,735 | 7/1976 | Noleusawa ........................ 354/50 X |

*Primary Examiner*—Michael L. Gellner

[57] ABSTRACT

In a photographic camera provided with an exposure control circuit including a light measuring circuit which measures scene brightness and a memory circuit which memorizes the output of the light measuring circuit, a switching circuit is connected between the light measuring circuit and the memory circuit. The switching circuit is connected with a time constant circuit so that the switching circuit may be turned off to lock the memory memorized in the memory circuit when the time determined by the time constant circuit has lapsed since the power source is turned on. In a preferred embodiment, the time constant circuit is further connected with the output of the light measuring circuit so that the time determined by the time constant circuit is varied in accordance with the scene brightness.

5 Claims, 3 Drawing Figures

F I G. 1
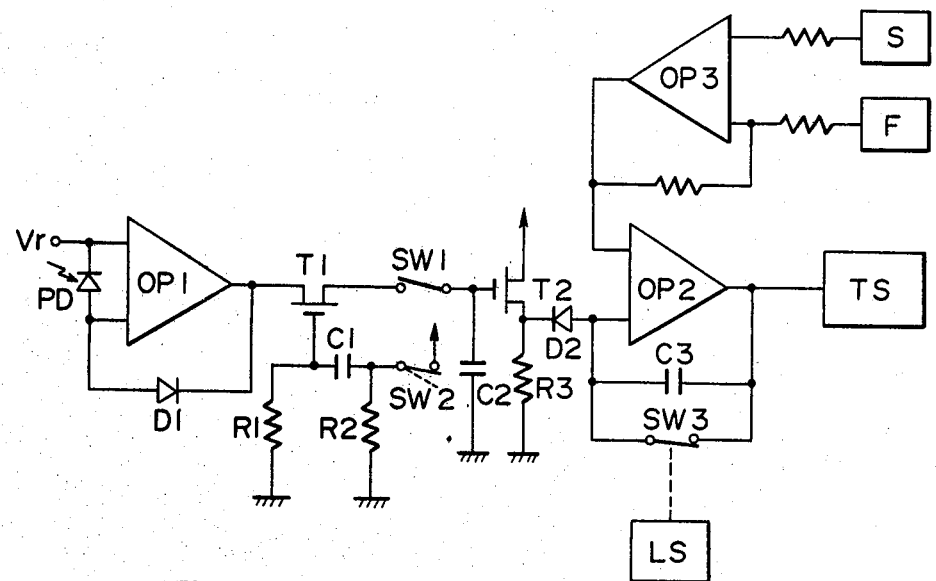
F I G. 2
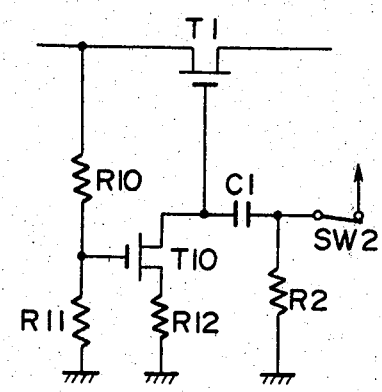
F I G. 3
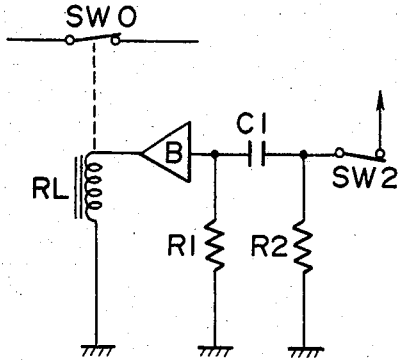

MEMORY LOCKING MEANS OF AN EXPOSURE CONTROL CIRCUIT FOR A CAMERA

This is a continuation of application Ser. No. 882,757 filed Mar. 2, 1978, which in turn was a continuation of application Ser. No. 703,607, filed July 8, 1976, both abandoned.

BACKGROUND OF THE INVENTION

1. Field of the Invention

This invention relates to a memory locking means in an exposure control circuit in a photographic camera, and more particularly to a means for locking a memory in an exposure control circuit for a predetermined period.

2. Description of the Prior Art

In conventional photographic cameras provided with memory locking means, the memory is locked immediately after a locking switch is turned on and the locked memory is not extinguished until the switch is turned off. Therefore, it sometimes happens that the photographer inadvertently forgets extinguishing the locked memory for the previous exposure and the exposure is controlled based on the old memorized information. The photographer must, therefore, be careful to extinguish the memory for the previous exposure by turning off the locking switch.

SUMMARY OF THE INVENTION

In view of the above-mentioned defects inherent in the conventional memory locking means, it is the primary object of the present invention to provide a means for locking a memory in an exposure control circuit of a camera which automatically extinguishes the memory when a predetermined time has lapsed since the memory is locked.

Another object of the present invention is to provide a means for locking a memory in an exposure control circuit of a camera in which the locked memory is automatically extinguished after the exposure is completed.

The above objects are accomplished by providing a switch which works as a power switch as well as a locking switch and is automatically turned off when a time determined by a time constant circuit has lapsed since the switch is turned on. The time constant of the time constant circuit is made variable in accordance with the output of a light measuring circuit. Further, the time constant circuit is automatically reset in response to turning off of the power.

BRIEF DESCRIPTION OF THE DRAWING

FIG. 1 is a circuit view showing an exposure control circuit employing a memory locking means in accordance with an embodiment of the present invention, FIG. 2 is a circuit view showing another embodiment of the memory locking means in accordance with the present invention, and FIG. 3 is a circuit view showing still another embodiment of the memory locking means in accordance with the present invention.

DESCRIPTION OF THE PREFERRED EMBODIMENTS

Referring to FIG. 1 showing an embodiment of the present invention applied to an exposure control circuit of a single lens reflex camera, a photodetector PD is connected with input terminals of an operation amplifier OP1. One of the input terminals thereof is connected with a reference voltage source Vr. The other input terminal is connected with the output of the operational amplifier OP1 by way of a log compression diode D1.

The output of the operational amplifier OP1 is connected with a mirror-up switch SW1 by way of a semiconductor switching element T1 (which will be described in detail hereinafter). The mirror-up switch SW1 is turned off in response to swing up of a mirror in the camera. The switch SW1 is connected with a memory capacitor C2 which is grounded and with the gate of a buffer semi-conductor element T2. The semi-conductor element T2 and said semi-conductor switching element T1 are MOS-FETs (Metal-Oxide Semi-conductor Field Effect Transistor). The source of the buffer element T2 is grounded by way of a source resistor R3. The source is further connected with the cathode of a time expansion diode D2 the anode of which is connected with one input terminal of a second operational amplifier OP2. Said input terminal of the second operational amplifier OP2 is connected with the output thereof by way of a parallel circuit of an integrating capacitor C3 and a shutter start switch SW3 which is turned off in response to start of a leading shutter blind LS of the camera. The other input terminal of the second operational amplifier OP2 is connected with the output of a third operational amplifier OP3. Two input terminals of the third operational amplifier OP3 are connected with a film sensitivity input means S and an aperture size input means F. The output of the second operational amplifier OP2 is connected with a trailing shutter blind TS to control the start thereof and controls the exposure time in accordance with the information given to the second operational amplifier OP2. The aforesaid exposure control circuit is well known in the art, and accordingly, the detailed description of the operation thereof is omitted.

Said semi-conductor switching element (MOS-FET) T1 has a gate which is connected with a junction between a resistor R1 and a capacitor C1 which constitute a time constant circuit. The capacitor C1 is connected with a power source (not shown) by way of a manually operable switch SW2. A conjunction between the capacitor C1 and the manually operable switch SW2 is grounded by way of a resistor R2 for discharge. The charge in the capacitor C1 is discharged through the resistors R1 and R2 to reset the time constant circuit R1, C1 when the switch SW2 is turned off. The drain and source of the semi-conductor switching element T1 are connected with the output of the first operational amplifier OP1 and the mirror-up switch SW1 respectively to turn on and off the transmission of the output from the light measuring circuit (constituted by the operational amplifier OP1, the photodetector PD and the log compression diode D1) to the memory capacitor C2.

In operation of the above described memory locking means in accordance with the present invention employed in an exposure control circuit for a single lens reflex camera, when the power is turned on by the first stage of depression of a shutter release button (not shown) while the manual switch SW2 is turned on, the circuit shown in FIG. 1 starts to operate and the output of the light measuring circuit is charged in the memory capacitor C2 since the semi-conductor switching element T1 is turned on. On the other hand, as the time lapses, the capacitor C1 is charged up and the voltage at the gate of the semi-conductor switching element T1 drops and accordingly the switching element T1 is turned off. Thus, the output of the light measuring circuit is prevented from being transmitted to the memory capacitor C2, and the memory in the capacitor C2 is locked. If the manual switch SW2 is turned off then, the charge stored in the capacitor C1 is discharged by way of the resistors R1 and R2, and the capacitor C1 is reset. Therefore, when the power is turned on again, the voltage at the gate of the semi-conductor switching element (MOS-FET) T1 is turned to a high level and the element T1 is turned on. Thus, the output of the light measuring circuit is memorized in the memory capacitor C2. When a time determined by the time constant of the time constant circuit has lapsed, the element T1 is turned off again and the memory is locked in the capacitor C2.

In response to the second stage of depression of the shutter release button, the leading shutter blind LS starts and the shutter start switch SW3 is turned off. Therefore, the capacitor C3 starts to be charged by the charge stored in said memory capacitor C2. The trailing shutter blind TS is started when the time determined by the memorized charge and the information from the film sensitivity input means F and the aperture size input means F has lapsed. Thus, the exposure is completed.

FIG. 2 shows another embodiment of the memory locking means in accordance with the present invention. The elements equivalent to those employed and shown in the above described embodiment of FIG. 1 are designated by like numerals. In this embodiment, said resistor R1 in the first embodiment is replaced by a semi-conductor element (FET) T10, a source resistor R12 connected in series therewith, a bleeder resistor R10 connected between the gate of the FET T10 and the output of the light measuring circuit, and a bleeder resistor R11 connected between the gate of the FET T10 and the ground. In this embodiment, the resistance between the drain and source of the FET T10 is varied in accordance with the output of the light measuring circuit. Therefore, the memory locking time is determined in accordance with the scene brightness measured by the light measuring circuit.

FIG. 3 shows still another embodiment of the memory locking means in accordance with the invention. In this embodiment, said semi-conductor switching element T1 is replaced by a relay switch SW0 which is turned on and off by a relay RL. The relay RL is controlled by the output of a buffer B which is connected with a time constant circuit constituted by a resistor R1 and a capacitor C1. In this embodiment also, the elements equivalent to those employed in the first embodiment are designated by like reference numerals. The relay RL is turned on to close the relay switch SW0 at first, and then the switch SW0 is turned off to lock the memory when the time determined by the time constant circuit has lapsed.

We claim:

1. A memory locking means of an exposure control circuit for a camera including a light measuring circuit for constantly supplying a changing voltage output indicative of changing scene brightness, a memory circuit connected therewith for memorizing the voltage output of the light measuring circuit, and normally closed first switching means connected in series between the light measuring circuit and memory circuit which is opened in response to shutter release operation for locking and memorized voltage in the memory circuit, electronic switching means connected in series with the first switching means between the light measuring circuit and the memory circuit for locking the memorized voltage in the memory circuit independently of the first switching means, a time constant circuit connected between a power source and said electronic switching means, and normally open manually operable second switching means connected between said time constant circuit and said power source, said time constant circuit being adapted to turn on said electronic switching means when the manually operable second switching means is turned on and turn off said electronic switching means when a time period determined by the time constant circuit has lapsed since the manually operable second switching means was turned on.

2. A memory locking means as defined in claim 1 wherein said time constant circuit is connected with said light measuring circuit so that the time constant determined by the time constant circuit is varied in accordance with the output of the light measuring circuit.

3. A memory locking means as defined in claim 1, wherein said electronic switching means is a semi-conductor switching element which is turned on by the output of the time constant circuit.

4. A memory locking means as defined in claim 1, wherein said electronic switching means is a relay switch which is turned on by the output of the time constant circuit.

5. A memory locking means as defined in claim 1, wherein said time constant circuit is reset in response to turning off of said second switching means.

* * * * *